United States Patent Office 3,704,136
Patented Nov. 28, 1972

3,704,136
PREPARATION OF RICOTTA CHEESE CURD
John Lavarda, 5999 Brecksville Road,
Cleveland, Ohio 44131
Filed Mar. 16, 1970, Ser. No. 19,939
Int. Cl. A23c 19/02
U.S. Cl. 99—116
23 Claims

ABSTRACT OF THE DISCLOSURE

A soft curd ricotta cheese is made by a process wherein the mixture containing the milk solids is heated and slowly acidified, e.g. with acetic acid and this slow acidification causes slow precipitation of the ricotta curd so that it settles to the bottom of the vat rather than rising to the top. This produces a fine grained curd which is kept sterile by the liquid above it being in excess of 140 degrees F. The acidification continues until the liquid is clear and essentially all the solids have settled and then the clear liquid is drained off leaving the ricotta curd ready for use.

BACKGROUND OF THE INVENTION

The prior art method of making ricotta cheese was to use a mixture of whey and the liquid containing milk solids, for example, skim milk or fresh buttermilk, the whey was heated to about 185 degrees F. and then the acid such as citric acid or vinegar was added rapidly and the heating was stopped. Precipitation occurred almost instantaneously due to this rapid addition of the acid. Accordingly the curd formed in large flakes and rose to the surface wherein it was scooped off by a perforated scoop and placed into five to ten pound containers with a screened bottom to drain off the excess liquid. It had to be handled a second time to be put into a filling machine or to be filled by hand into containers for use by the consumers.

This prior art process had several disadvantages, the first being that the curd was formed rapidly and floated to the top where it was subject to contamination by air borne bacteria; a second disadvantage was that the floating curd had to be scooped off with a perforated scoop thus subjecting the curd to still more air-borne bacteria as it left the protective environment of the hot water which previously had kept it sterile by being in excess of 140 degrees F.; a third disadvantage was that the curd was further contaminated by being placed in the small containers with a screened bottom permitting it to cool to room temperature as it drained off the excess liquid and thus contamination could come from the air or the small containers as the curd cooled. A fourth disadvantage was that this curd had to be handled again by placing it in a filling machine for machine filling of small containers for retail consumption or else the small containers had to be filled by hand, in either event further contamination resulted because this part of the process was carried out at temperatures less than 140 degrees F. It was well known that this ricotta cheese was not very suitable for consumer packaging and the reason was that the resulting cheese had a very short shelf life of perhaps one to two weeks even under refrigeration. This was the cause of many returned packages which had spoiled, thus reducing the profit from the operation as well as incurring the ill-will of the purchasers of such spoiled cheese. The prior art process of making ricotta cheese by rapid acidification is generally set forth in the publication entitled "Cheese and Fermented Milk" by Frank Kosikowski, copyright 1966, published by Edwards Bros., Ann Arbor, Mich.

A very old process of making ricotta cheese as practiced in Italy was that the whey and milk mixture was acidified before heating, then heated to 170 degrees which caused precipitation but again the curd came to the top where it was again dipped off by hand and liquid strained out. This very old process had the very same disadvantages of the other prior art processes and the present invention has the same advantages over such old process.

Accordingly the problem solved by the present invention is the production of a ricotta cheese which by the nature of the process inherently has a much more sterile procedure, vastly reducing the chances for contamination of the ricotta cheese curd during manufacture and thus permitting manufacture of ricotta cheese which has a shelf life of five to six months, and hence is eminently suitable for consumer packaging. The process of the present invention also results in a cheese which is handled less and requires fewer implements in the handling thereof, thus reducing the man hours required for producing the cheese. Another advantage of the present invention is that by the gradual acidification of the heated milk mixture, it may be readily determined when the acid content of the entire mixture has reached the appropriate point by merely observing that the liquid has become clear indicating that essentially all of the milk solids have settled to the bottom. This eliminates the possibility of reaching too high an acid concentration by the prior art method of rapidly adding the acid wherein such too high an acid concentration could result in spoiling the entire vat full of perhaps 8,000 pounds of the milk mixture.

SUMMARY OF THE INVENTION

The invention may be incorporated in the process of making ricotta cheese, comprising the steps of, heating in a container a quantity of liquid mixture containing milk solids to about 140 to 160 degrees F., heating the mixture to a temperature in the order of 180 degrees F., slowly adding over a period of 10 to 30 minutes an acidifying agent diluted in a hot liquid with the first additions being more diluted than the later additions to coagulate ricotta curd and precipitate it to the bottom of the container until the liquid on the top is substantially clear, and separating the liquid from the curd.

An object of the invention is to provide a ricotta cheese-making process wherein the resulting cheese is kept more sterile than in the prior art method.

Another object of the invention is to provide a ricotta cheese-making process wherein the curd is precipitated to the bottom instead of floating to the top, thus not only lessening the chance for contamination but permitting less handling of the curd and making it easier to separate the liquid from the curd.

Another object of the invention is to provide a ricotta cheese-making process wherein the milk mixture is gradually acidified to result in a gradual clearing up of the liquid so that it is easy to determine when all of the milk solids have settled out of the mixture and thus avoiding the possibility of over-acidification which could suddenly coagulate and ruin the entire milk mixture.

Other objects and a fuller understanding of the invention may be had by referring to the following description and claims, taken in conjunction with the accompanying drawing.

DESCRIPTION OF THE PREFERRED EMBODIMENT

Figure 1:
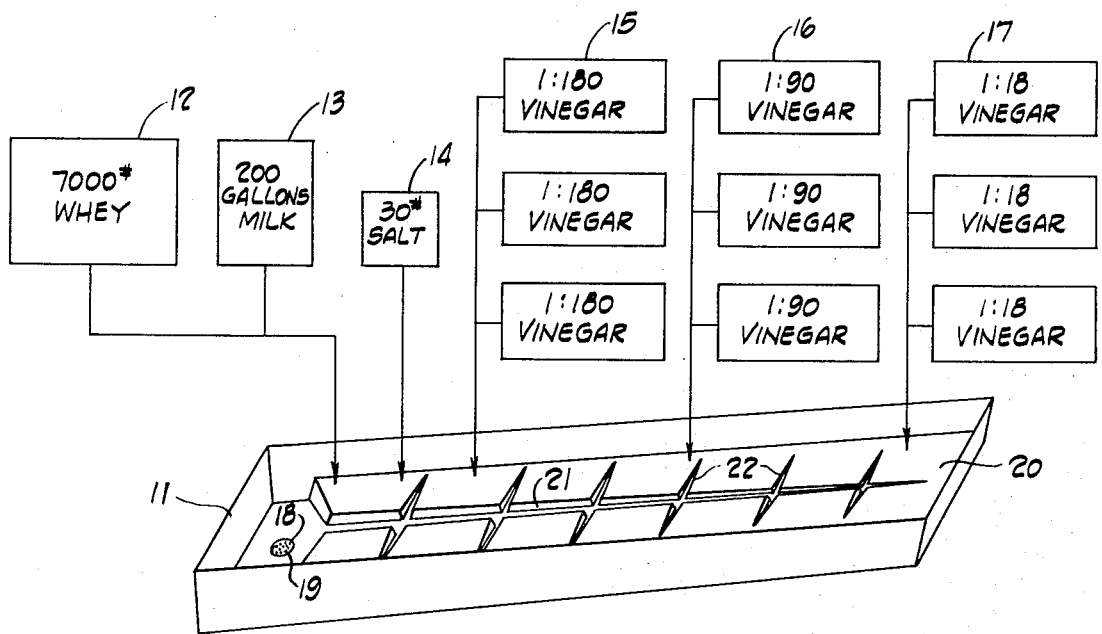
FIG. 1 is a combined isometric drawing of a cheese vat and a flow chart illustrating the ricotta cheese-making process of the invention.

FIG. 1 of the drawing is a combined isometric drawing and flow chart illustrating the preferred embodiment of the invention for making ricotta cheese. The cheese is made in a regular rectangular cheese vat 11 which is perhaps 18 to 20 feet long and will hold about 8,000 to 10,000 pounds of liquid. About 7,000 or 8,000 pounds of fresh whey 12 is put into the vat with this whey being that left after mozzarella or provelone cheese curd has been made. The whey is heated to a range of about 140 to 160 degrees and then to this whey 12 in the vat 11 there is added 20 cans of whole milk, 10 gallons to a can or a total of 200 gallons, with this milk being 3.5% butterfat content. At 8.6 pounds per gallon this is an addition of about 1,760 pounds of whole milk 13. Next salt 14 is added according to taste and about 30 pounds is satisfactory for a batch of from 7,000 to 10,000 pounds of milk mixture in the vat 11. Next the milk mixture or starting mixture in the vat is heated by direct steam injection from a pipe line into the vat until the entire mixture has reached a temperature in the order of 180 degrees. It is preferred that this temperature be in the range of 183 to 185 degrees. Under-heating can result in too soft a curd and the mixture will not completely precipitate resulting in a loss of solids and a soft high-moisture content product. Over-heating can result in a too-dry and gritty textured finished product.

After reaching the proper temperature of 183–185 degrees F. the steam injection is turned off and a slow acidification process is commenced. The acidification is done not only slowly but also with a very dilute acid in several doses and with this concentration of acid gradually increasing. The slow addition of the acid is over a period of ten to thirty minutes. In the preferred embodiment this takes place in three separate groups of doses 15, 16 and 17 with the doses in each group being of the same acid concentration and with three doses in each of the first and second groups and five doses in the third group. In the first group 15 each dose is 7 ounces of 120 grain vinegar in ten gallons of hot water. One-hundred-twenty grain vinegar is a concentrated vinegar of 12% acetic acid and this addition into a ten gallon milk can makes a very dilute acid concentration of 0.065% acid. A man may walk slowly alongside the vat and pour the entire ten gallon dilute acid contents into the vat 11. Next with a wooden paddle and dipping perhaps one inch below the surface, the workman may gradually roll the acid stream to both sides of the vat to make certain of even distribution of the dilute acid just poured in from the first dose. Then the second dose may be slowly added after a wait of two to three minutes and again the third dose may be added after another two to three minutes with distribution and slight stirring of the acid stream with the wooden paddle during or between each of these doses.

Next a second group 16 of three doses of dilute acid is added and in this preferred embodiment each dose consists of 15 ounces of 120 grain vinegar diluted in 10 gallons of hot water. Each of these three doses in the second group 16 is added in the same manner as the doses in the first group, each dose being added slowly and then stirred slightly or spread evenly into the mixture. A third group of doses 17 is next added and in this preferred embodiment there are five doses in this group with each dose containing 75 ounces of 120 grain vinegar diluted in 10 gallons of hot water. Each dose in this third group is added in the same way with slight stirring of the milk mixture between each dose. As the last of these doses is added it will be noted that the mixture on top is clearing because of the settling of the albumen or precipitated ricotta curd to the bottom of the vat. This entire step of slow acidifying with dilute acid and increasing concentrations of dilute acid takes about 20 to 30 minutes and clears up the mixture with the ricotta curd having sunk to the bottom instead of floating to the top and instead the liquid on the top is about 98% water, clear and essentially transparent. At this time the contents of the vat will have cooled slightly because the steam has been shut off, but the temperatture will remain above at least 170 degrees F. whereat the contents will remain sterile because as long as the contents remain above 140 degrees, which is the pasteurizing temperature, the air-borne bacteria cannot live in this hot mixture; hence the entire mixture is sterile. The ricotta curd which has settled to the bottom is a fine curd as distinguished from the large flakes of curd which occur in the prior art process. One theory of operation is that in the old prior art process of large flakes being rapidly formed by the rapid acidification, it was felt that air bubbles were trapped in these large flakes of curd and the air bubbles accordingly made the entire flakes float to the top. In the present process of producing a fine grained precipitant, it is felt that air bubbles are not trapped in such curd and hence it settles to the bottom rather than floating to the top.

After the final dosage of the 11 doses if the mixture is not completely clear, additional doses of vinegar and water at the same concentration of those of the third group should again be added gradually until the liquid on top is substantially clear. This clarity indicates that all of the milk solids have precipitated and settled to the bottom and thus indicates that one is not losing any of the milk solid by subsequent draining off of the clear liquid.

The ratio of concentration of vinegar to hot water in the preferred embodiment is 7 ounces of 120 grain vinegar in ten gallons of hot water for the first three doses and this is a ratio of one part vinegar to 180 parts of water. The second group of three doses is 15 ounces of vinegar to the ten gallons of water and hence this is a ratio of about one part vinegar to 90 parts water. The third group of five doses wherein 75 ounces of 120 grain vinegar is added to 10 gallons of water is a ratio of about one part vinegar to 18 parts of water. Thus, in each case a dilute vinegar or a dilute acidifying agent is added to the mixture in the vat 11. After the liquid has become clear due to settling of the milk solids to the bottom, the clear liquid has been tested and found to be in the range of .14% to .18% acid, generally around .16% acid. This is less than one would normally expect because under the old process enough acid was rapidly added in order to produce a total acidity of .32% acid in the total mixture. This was one of the disadvantages of the old method because if this acidity got as high as .33% or .34%, then the entire batch could be spoiled and completely lost.

Next, after this acidifying step a rake is used to push the curd back away from a drain outlet 18 and the curd is pushed slowly back toward the other end of the vat 11. Next a fine meshed screen 19 of a mesh of about 1/32 inch is placed over this drain outlet 18 and the liquid is separated from the curd by slowly draining off the clear liquid from the top. As the liquid drains off the settled curd 20, a rake is used to ditch this curd into a main trunk 21 and branches 22 to drain toward the screened outlet 18. This drainage takes about 1½ hours until the curd has been reduced to a water content of about 75 to 80%.

With the drainage completed, a rake is used to rake up the curd into small chunks to be fed into a positive displacement pump which pumps the curd with a screened outlet into a filling machine. The screen on the outlet may be a fine mesh, for example, 1/32 inch mesh and the filling machine may operate under a nitrogen atmosphere to fill containers for consumers, for example, one pound containers. The nitrogen atmosphere during filling of the containers preserves the sterile nature of the ricotta cheese so that these small containers will have a long shelf life, for example, five to six months.

The mixture in the vat 11 may be considered a liquid carrier containing milk solids which are essentially milk protein and fat and this may be considered as a milk mixture from which the ricotta cheese curd will be precipiated. It has been found that many different starting mixtures may be used to obtain the ricotta cheese curd 20 and with each of these different starting mixtures used, the gradual acidification with gradually increasing acid concentrations may be slightly different. The following examples of different starting mixtures and different dosages of the gradual acidification illustrate the various processes within the scope of the present invention.

EXAMPLE 1

[7,000 lbs. whey, 250 gallons of whole milk or 2,150 lbs. of whole milk]

| | | | | |
|---|---|---|---|---|
| 7 oz | Vinegar 120 grain | 10 gallons water | 1st application. |
| 7 oz | do | do | do | 2d application. |
| 14 oz | do | do | do | 3d application. |
| 14 oz | do | do | do | 4th application. |
| 28 oz | do | do | do | 5th application. |
| 28 oz | do | do | do | 6th application. |
| 42 oz | do | do | do | 7th application. |
| 42 oz | do | do | do | 8th application. |
| 84 oz | do | do | do | 9th application. |
| 84 oz | do | do | do | 10th application. |
| 84 oz | do | do | do | 11th application. |
| 84 oz | do | do | do | 12th application. |
| 84 oz | do | do | do | 13th application. |

UNTIL CLEAR

EXAMPLE 2

[7,000 lbs. whey, 140 gallons condensed skim 30% solids, 25 gallons of sweet cream or vegetable fat (40%) fat content]

| | | | | |
|---|---|---|---|---|
| 7 oz | Vinegar 120 grain | 10 gallons water | 1st application. |
| 7 oz | do | do | do | 2d application. |
| 14 oz | do | do | do | 3d application. |
| 14 oz | do | do | do | 4th application. |
| 28 oz | do | do | do | 5th application. |
| 28 oz | do | do | do | 6th application. |
| 42 oz | do | do | do | 7th application. |
| 42 oz | do | do | do | 8th application. |
| 84 oz | do | do | do | 9th application. |
| 84 oz | do | do | do | 10th application. |
| 84 oz | do | do | do | 11th application. |
| 84 oz | do | do | do | 12th application. |
| 84 oz | do | do | do | 13th application. |
| 84 oz | do | do | do | 14th application. |
| 84 oz | do | do | do | 15th application. |
| 84 oz | do | do | do | 16th application. |
| 84 oz | do | do | do | 17th application. |

UNTIL CLEAR

EXAMPLE 3

[7,000 lbs. whey, 50 gallons condensed skim 30% solids, 15 gallons of sweet cream or vegetable fat (40%) fat content]

| | | | | |
|---|---|---|---|---|
| 7 oz | Vinegar 120 grain | 10 gallons water | 1st application. |
| 7 oz | do | do | do | 2d application. |
| 14 oz | do | do | do | 3d application. |
| 14 oz | do | do | do | 4th application. |
| 28 oz | do | do | do | 5th application. |
| 28 oz | do | do | do | 6th application. |
| 42 oz | do | do | do | 7th application. |
| 42 oz | do | do | do | 8th application. |
| 84 oz | do | do | do | 9th application. |
| 84 oz | do | do | do | 10th application. |
| 84 oz | do | do | do | 11th application. |
| 84 oz | do | do | do | 12th application. |
| 84 oz | do | do | do | 13th application. |
| 84 oz | do | do | do | 14th application. |
| 84 oz | do | do | do | 15th application. |

UNTIL CLEAR

EXAMPLE 4

[7,000 lbs. whey, 30 gallons condensed skim 30% solids, 10 gallons of sweet cream or vegetable fat (40%) fat content]

| | | | | |
|---|---|---|---|---|
| 7 oz | Vinegar 120 grain | 10 gallons water | 1st application. |
| 7 oz | do | do | do | 2d application. |
| 14 oz | do | do | do | 3d application. |
| 14 oz | do | do | do | 4th application. |
| 28 oz | do | do | do | 5th application. |
| 28 oz | do | do | do | 6th application. |
| 42 oz | do | do | do | 7th application. |
| 42 oz | do | do | do | 8th application. |
| 84 oz | do | do | do | 9th application. |
| 84 oz | do | do | do | 10th application. |
| 84 oz | do | do | do | 11th application. |
| 84 oz | do | do | do | 12th application. |
| 84 oz | do | do | do | 13th application. |

UNTIL CLEAR

In the above examples the notation "UNTIL CLEAR" indicates that additional dosages of the same concentration as the last dosages may be added to clear up the liquid on the top and this will take into account the different acidification of the starting mixture, for example, the whey used in starting the mixture may have a different acid content from time to time or some of the various additives can change the total acid content. For example, powdered skim milk could be used in the starting mixture as well as sweet cream or vegetable fat can be used. Powdered whole milk may also be used in various combinations to put into the starting mixture to come up with a desired fat moisture and solid content in the finished ricotta cheese curd 20.

By starting out gradually with the acidification in a very dilute mixture and gradually adding such mixture and gradually increasing the acidity of such dosages permits the mixture in the vat 11 to gradually clear up and thus the operator may easily observe the progress of the cheese-making process. Accordingly, he may stop the gradual acidification at the appropriate time when the liquid on top becomes clear. This is a very definite advantage over the prior art method which added all of the acid at one time. If the whey with which one started had too high an acid content and too much acid was added, then one could exceed the critical acid content resulting in a rapid coagulation to a solid mass and thus the entire vat contents would be lost. This possibility is eliminated by the present gradual acidification method. Another advantage of the present method is that the clear liquid is retained on the top and is hotter than 140 degrees to keep the settled curd sterile. There is no handling in perforated scoops nor draining in five to ten pound screened bottom containers as in the prior art method which rapidly cooled the curd and materially increased the chances for contamination by air-borne bacteria or other contamination in these scoops or containers. Thus, the curd 20 remains sterile to very greatly increase the shelf life from one to two weeks of the prior art process to five to six months achieved by the present process. Not only is there less handling of the curd which reduces the chance of contamination, but this lessened handling means less man-hours of work necessary for production of the cheese, because the curd merely settles to the bottom by its own action rather than a workman having to skim off the floating curd to place it in drainage containers.

Figure 2:
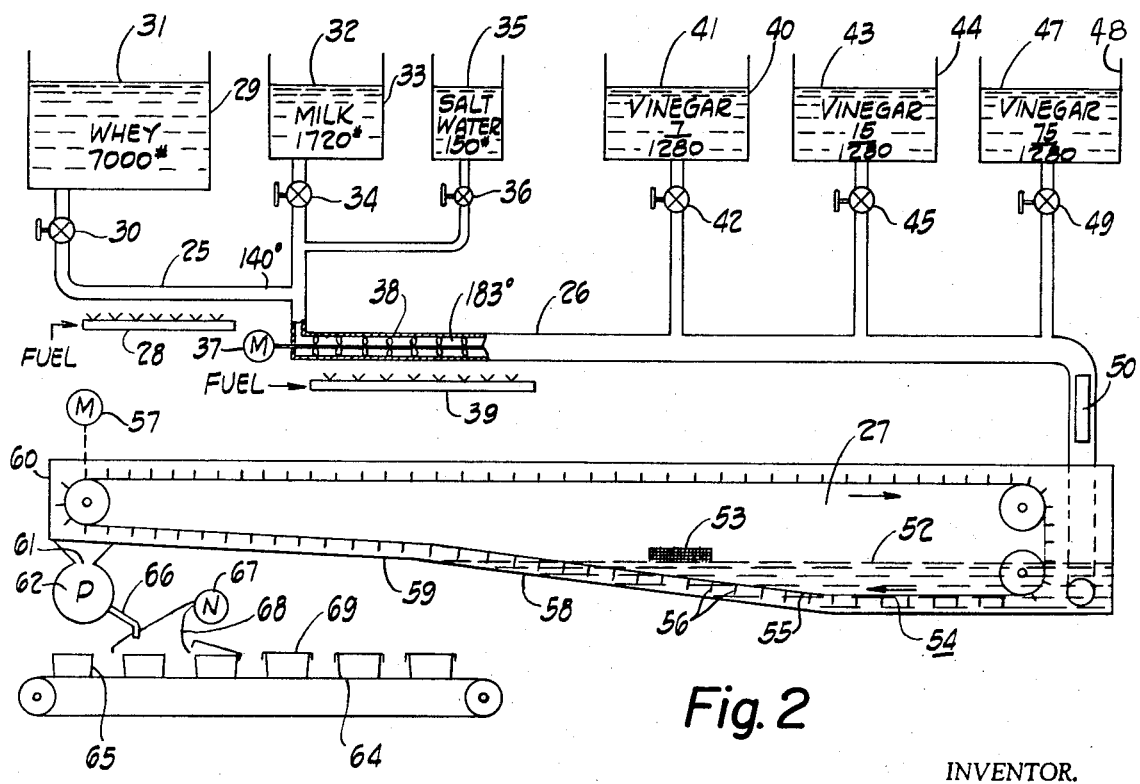
FIG. 2 is a schematic diagram of a continuous ricotta cheese-making process according to the invention.

FIG. 2 of the drawing illustrates a continuous cheese-making process according to the present invention wherein a container is illustrated by a first conduit 25, a second conduit 26 and a tank 27. A burner 28 heats the whey in the first conduit 25 which is continuously supplied from a tank 29 through a valve 30. Thus the whey 31 in the tank 29 is delivered to the conduit 25 to be heated to the preferred temperature of about 140 to 160 degrees F. Next, milk 32 is supplied from a tank 33 through a valve 34 and mixes with the whey 31 and this starting mixture is supplied to the second conduit 26. Salt to taste is added by a concentrated salt solution 35 contained in a tank and supplied through a valve 36 to the entrance to the conduit 26. This salt solution may be a ratio of 30 pounds of salt to 120 pounds of water so that 150 pounds of the salt solution is added for each 1,760 pounds of milk and 7,000 pounds of whey. A motor 37 drives paddle blades 38 within the second conduit 26 in order to stir the mixture as it is being heated by a second burner 39 to the preferred temperature in the order of 180 degrees to 190 degrees and preferably from 183 to 185 degrees F. This heated milk mixture is supplied along the conduit 26 to an area whereat a gradual acidification process is achieved. A first tank 40 contains a dilute vinegar 41 which is supplied through a valve 42 to the conduit 26. This dilute vinegar in the preferred embodiment is at a ratio of 7 ounces of 120 grain vinegar to ten gallons of hot water, the water being about 180 degrees F. This is at a ratio of 7:1,280 or a ratio of one part of acetic acid to 1,525 parts of hot water.

This dilute vinegar dosage is supplied to the conduit 26 and is mixed with this starting milk mixture by the paddle blades 38. As the mixture flows along through the conduit 26, it reaches an area for a second addition of dilute vinegar 43 from a tank 44 as controlled by a valve 45. In this preferred embodiment the dilute vinegar 43 is at a ratio of 15 ounces of 120 grain vinegar in ten gallons of hot water. Again this dilute vinegar is slowly added to the mixture to start the mixture toward a precipitation of the curd.

A third dosage of vinegar is provided by dilute vinegar 47 contained in a tank 48 and as controlled by a valve 49. This dilute vinegar 47 in this preferred embodiment is preferably at a concentration of 75 ounces of 120 grain vinegar in ten gallons of hot water. A window 50 may be provided in the conduit 26 to observe the clarity of the heated mixture and at this point the conduit 26 may empty into the tank 27. The two conduits 25 and 26 and the tank 27 may all be on the same level, the FIG. 2 merely being folded in order to show the process on a larger scale. The heated mixture fills the tank 27 to a level shown at 52 as determined by a screened overflow 53 at the downstream end of the tank 27. A scraper conveyor 54, for example, formed from a chain 55 and transverse blades 56 is slowly moved by a motor 57 to slowly scrape the settled ricotta curd from the bottom of the tank 27 up a sloping bottom 58 past the overflow outlet 53. A sloping extension 59 of the sloping bottom wall 58 at the tank permits the curd to be drained of excess moisture until it has reached a moisture content of about 75 to 80% by the time it reaches the left end 60 of the tank 27. The curd is deposited in an inlet 61 of a positive displacement pump 62. A container conveyor 64 moves small containers 65, for example, one pound containers suitable for retail sale, along past the outlet 66 of the pump 62. A source of gaseous nitrogen 67 supplies a blanket of nitrogen for a nitrogen atmosphere during the process of filling the containers 65 and capping them with lids 69. This provides a nitrogen atmosphere during the packaging and in fact the entire inside of the tank 27 may be provided with a nitrogen atmosphere to still further the increase of sterility of the finished ricotta cheese.

Another advantage of the present invention is that even after the clear liquid has been drained off from the settled curd 20, this curd remains sterile because it remains hot by being in a large monolithic slab or mass, therefore, cooling down quite gradually. In the prior art system of draining in small five or ten pound strained bottom containers, a large surface area was exposed to the air or to such containers for a heat exchange to rapidly cool down the cheese and thus it had a much greater chance for contamination.

Other acids may be used than the acetic acid normally found in vinegar, for example, malic, citric acid or even sour whey. The use of sour whey was almost unthinkable in the prior art method because it was hard to determine the actual acidity of such sour whey. Then after the sudden acidification as by the prior art method, if this total acidity of the heated milk mixture was too great, then this could result in a total loss of the entire vat contents. By the slow acidification of the present process and the consequent chance to observe the gradual clearing of the liquid on top, the acidification can be carried out correctly and completely without danger of over or under-acidification.

By the first step of using 7 ounces of 120 grain vinegar in ten gallons of hot water, this is a concentration of 0.065% acid in the ten gallons of water. When this ten gallons of dilute acid is added to the approximately 950 gallons in the vat 11, this is a concentration of acid of less than 1/100 percent in the mixture in the vat. In fact, less than 1/100 percent of acid.

Another advantage of the present invention is that because the liquid is on the top and the settled curd is on the bottom, one can actually easily observe that the liquid has become clear, indicating that substantially all of the milk solids have been precipitated out of the mixture. In the old method wherein the acid was rapidly added and the curd floated to the top, this prevented one from seeing the liquid itself and from seeing the clarity of such liquid; therefore, it was not known whether there were milk solids still in suspension, and hence such milk solids would be lost, resulting in an uneconomic production of the ricotta cheese.

The present disclosure includes that contained in the appended claims as well as that of the foregoing description. Although this invention has been described with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. The process of making ricotta cheese curd, comprising, the steps of,
    heating in a container a quantity of liquid mixture containing milk solids to a temperature in the order of 180 degrees F.,
    slowly adding over a period of ten to thirty minutes an acidifying agent diluted in a hot liquid with the first additions being more diluted than the later additions to coagulate ricotta curd and gradually as the agent is added precipitate it to the bottom of the container until the liquid on the top is substantially clear,
    and separating the liquid from the curd to obtain said ricotta cheese curd.

2. The process as set forth in claim 1, wherein said liquid mixture includes whey.

3. The process as set forth in claim 1, wherein said liquid mixture includes milk and whey with the whey in a volume which is large relative to volume of milk.

4. The process as set forth in claim 1, including salt in the mixture.

5. The process as set forth in claim 1, wherein said mixture includes whey, adding milk and salt to the whey and continuing heating the mixture.

6. The process as set forth in claim 1, wherein the mixture is heated to a range of 180 degrees to 190 degrees F.

7. The process as set forth in claim 1, wherein the mixture is heated to a range of 183 degrees to 185 degrees F.

8. The process as set forth in claim 1, wherein the mixture is heated to the 180 degree F. range by direct steam injection.

9. The process as set forth in claim 1, wherein the dilute dilute acidifying agent is added in a plurality of separate doses.

10. The process as set forth in claim 1, wherein the acidifying agent is acetic acid.

11. The process as set forth in claim 1, wherein the acidifying agent is vinegar.

12. The process as set forth in claim 1, wherein the acidifying agent is vinegar added in a plurality of doses and diluted in hot water.

13. The process as set forth in claim 1, wherein the acidifying agent is vinegar diluted in hot water at a concentration of less than one percent acid in the water for the first addition.

14. The process as set forth in claim 13, wherein the first addition of acidifying agent results in a concentration of less than one-hundredths percent of acid in the mixture.

15. The process as set forth in claim 1, wherein the acidifying agent is added in doses, with the doses progressively increasing in acid concentration.

16. The process as set forth in claim 15, wherein the doses are divided into successive groups, with the doses in each group being of the same acid concentration.

17. The process as set forth in claim 16, wherein there are three doses in each of the first and second groups and five doses in the third group.

18. The process as set forth in claim 17, wherein the first group has an acetic acid concentration of about .065% in hot water, the second group has an acetic acid concentration of about .14% in hot water, and the third group has an acetic acid concentration of about .7% in hot water.

19. The process as set forth in claim 1, including raking tne settled curd away from a drain opening in the container, and draining off the liquid from the curd.

20. The process as set forth in claim 19, including using a vat as the container, forming ditches in the shape of a main trunk and branches draining toward the drain opening until the settled curd has been reduced to about 75 to 80% water content.

21. The process as set forth in claim 1, including breaking up the curd after separation from the liquid, and pumping the curd into smaller containers.

22. The process as set forth in claim 1, including adding the acidifying agent continuously at a plurality of locations.

23. The process as set forth in claim 2, including heating the whey to a temperature in the range of about 140 to 160° F. prior to mixing milk solids with the whey, and subsequently heating the liquid mixture to a temperature in the order of 180° F.

References Cited

UNITED STATES PATENTS

| 3,298,836 | 1/1967 | Ernstrom | 99—116 |
| 3,411,920 | 11/1968 | Holder et al. | 99—116 |
| 3,543,403 | 12/1970 | Speglic et al. | 99—116 X |

OTHER REFERENCES

Kosikowski, F., Cheese and Fermented Milk Foods, published by the author. Department of Food Science Cornell University, Ithaca, N.Y., 1966 (pp. 142-149, 158-160 and 168-173).

A. LOUIS MONACELL, Primary Examiner

D. M. NAFF, Assistant Examiner